TAPE TRANSPORT SYSTEM

Filed Jan. 20, 1955

INVENTOR.
FREDERICK S. Mc CORMICK
BY
Christie, Parker & Hale
ATTORNEYS

United States Patent Office 2,815,907

Patented Dec. 10, 1957

2,815,907

TAPE TRANSPORT SYSTEM

Frederick S. McCormick, Arcadia, Calif., assignor, by mesne assignments, to Consolidated Electrodynamics Corporation, Pasadena, Calif., a corporation of California Application January 20, 1955, Serial No. 483,135

4 Claims. (Cl. 242—55.12)

This invention relates to tape transport systems and more particularly to improved apparatus for controlling the movement of a tape from a supply station to a take-up station through an operational zone.

Where a relatively long strip of material such as a magnetizable tape in an electronic computer must be moved rapidly through an operational zone, it is often desirable to be able to determine when a predetermined portion of the tape reaches a given position. For example, in a computer system in which tape is passed from a supply reel to a take-up reel, or vice versa, the tape travel must be limited or the tape will become disengaged from one of the reels and will usually require re-threading. This is a time consuming operation and in many cases would render the system impractical. It is equally important that the tape transport system be protected against failure such as tape breakage. In most transport systems it is essential that there be included a failure sensing device to stop tape transport when failure occurs. It is also often desirable in a tape transport system to be able to selectively utilize only a portion of a long length of tape and it is advantageous to have some sensing means to indicate the portion of the tape to be utilized.

Briefly, the invention provides improved and inexpensive apparatus for sensing the position of a perforation or opening in a tape used in a tape transport system. This apparatus is disclosed but not claimed in co-pending application Serial No. 430,334, filed May 7, 1954.

The invention contemplates a tape sensor for detecting the position of a perforation in a moveable tape which comprises a chamber having an aperture over which the tape is arranged to slide. Means are provided for maintaining a pressure differential between the interior and exterior of the chamber, and means are also provided for detecting the change in pressure in the chamber when the tape perforation passes over the aperture.

Preferably, the change in pressure differential is used to actuate an electric switch which generates a control signal that may be used for a variety of purposes such as stopping or reversing the movement of the tape, changing the channel of information being utilized from the tape, etc.

Figure 2:
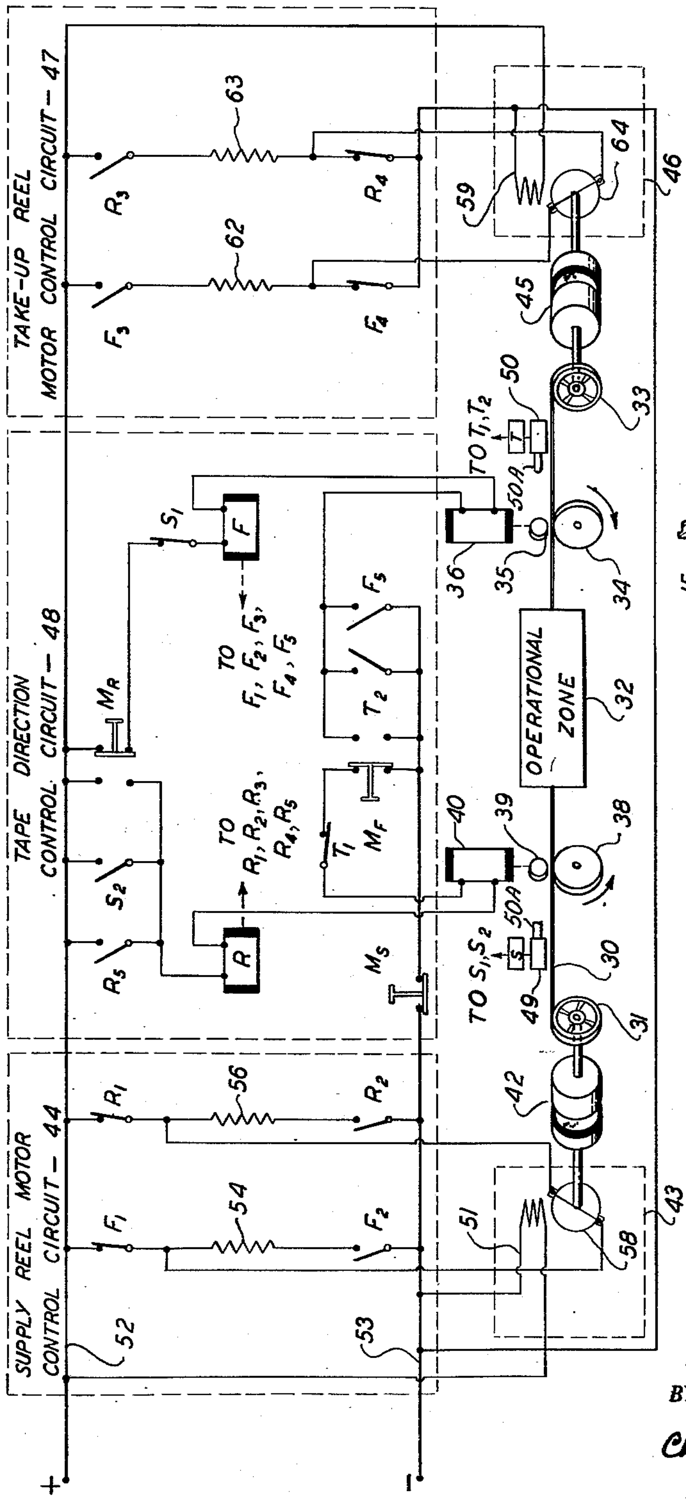
Figure 1:
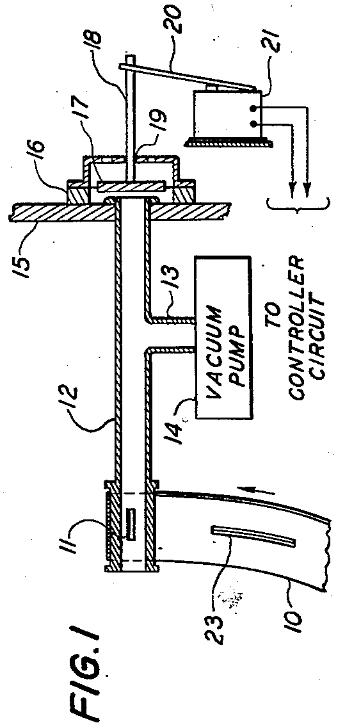

These and other aspects of the invention will be more fully understood from the following detailed description taken in conjunction with the accompanying drawings in which:

Fig. 1 is a sectional elevation of one arrangement of apparatus for sensing the position of a tape perforation; and Fig. 2 is a schematic circuit diagram of one embodiment of the invention showing one form of control circuity in the tape transport system.

Referring to Fig. 1, a tape 10, such as a magnetizable tape used in a computer system, is arranged to slide over an aperture 11 adjacent one end of a cylindrical tube or vacuum chamber 12 which is connected by a conduit 13 to a vacuum pump 14. The end of the tube adjacent the aperture is closed and the other end of the tube is open and extends through a supporting plate 15 into the center of an annular diaphragm housing 16 which is sealed to the plate. A flexible diaphragm 17 is sealed across the housing perpendicular to the tube axis and closes the open end of the tube from the atmosphere. An actuating shaft 18 rigidly attached to the center of the diaphragm extends outwardly through an opening 19 in the diaphragm housing and is connected to the outer end of a movable lever arm 20 on a micro-switch 21 arranged to actuate the switch. The micro-switch may be arranged to supply an electrical signal to any one of several types of controller circuits depending on the function which the tape perforation is to serve.

As long as the aperture is covered by the tape, a vacuum is maintained within the chamber and the diaphragm is deflected inwardly. This position may either hold the micro-switch open or closed, as required. If the tape is provided with a perforation 23 and the tape perforation is moved over the aperture, the pressure within the chamber will increase allowing the diaphragm to be deflected outwardly, thus actuating the micro-switch. Preferably the perforation is in the form of an elongated slit as shown in Fig. 1 so that even when the perforation is in register with the aperture, the aperture is not completely uncovered. This arrangement serves a useful purpose described in connection with the embodiment of Fig. 2.

Although this apparatus is preferably used with unperforated tape such as magnetic tape, it may also be used with perforated tapes providing the tape perforation or opening which is to actuate the micro-switch is substantially larger than information perforations to produce a pressure change substantially different from the change produced by the information perforation.

If desired, a plurality of apertures and vacuum chambers with associated micro-switches may be used, each of the apertures being laterally displaced with respect to the direction of tape movement to define a separate "channel" on the tape. The tape may then be perforated in the various channels to represent coded information to control tape movement or processing in the operational zone.

A typical control circuit in which the tape position sensor of Fig. 1 may be used in a tape transport system to sense the end of the tape, to reverse or stop the tape, and also stop the tape in the event of tape breakage is shown in Fig. 2. A magnetizable tape 30 is arranged to pass from a supply reel 31 through an operational zone 32 to a take-up reel 33. Separate perforations of the type illustrated in Fig. 1 are provided near each end of the tape. The tape passes between a forward driving capstan 34 and forward pinch roller 35 adapted to be actuated by a solenoid 36, and also between a reverse driving capstan 38 and a reverse pinch roller 39 adapted to be actuated by a solenoid 40. The forward capstan and reverse capstans are continuously rotated in opposite directions at high speed by any suitable source of power (not shown) so that if either pinch roller is actuated by its respective solenoid, the tape is forced into frictional driving engagement with the associated capstan to be pulled through the operational zone in either a forward or reverse direction depending on which solenoid is actuated.

The supply reel is driven through a first slipping clutch 42 by a supply reel motor 43, the direction of which is determined by a supply reel motor control circuit 44. The take-up reel is driven through a second slipping clutch 45 by a take-up reel motor 46, the direction of which is determined by a take-up reel motor control circuit 47. A tape direction control circuit 48 controls the transport of the tape through the operational zone and the two motor control circuits in the manner described below. A tape sensor 49 of the type shown in Fig. 1 is disposed adjacent the supply reel to actuate a four-pole micro-switch S having its two pairs of contacts $S_1$ and $S_2$ in the tape direction control circuit. A similar tape sensor 50 is disposed adjacent the take-up reel to actuate a four-pole micro-switch T having its two pairs of contacts $T_1$ and $T_2$ in the tape direction control circuit.

Referring to the supply reel motor and its control circuit, the supply reel motor field coil 51 is connected between a positive lead 52 and a negative lead 53 which are energized from a suitable source of D. C. potential (not shown). Relay contacts $F_1$ of a forward master relay F in the tape direction control circuit are connected in series with a resistor 54 and relay contacts $F_2$ of relay F across the positive and negative leads. Relay contacts $R_1$ are connected in series with a resistor 56 and relay contacts $R_2$ of relay R across the positive and negative leads. Armature 58 of the supply reel motor is connected between a point between the contacts $F_1$ and the resistor 54, and a point between the contacts $R_1$ and the resistor 56.

Referring to the take-up reel motor and its control circuit, the take-up reel motor field coil 59 is connected between the positive and negative leads, and relay contacts $F_3$ of relay F are connected in series with a resistor 62 and relay contacts $F_4$ of relay F between the positive and negative leads. Contacts $R_3$ of relay R are connected in series with a resistor 63 and relay contacts $R_4$ of relay R across the positive and negative leads. Armature 64 of the take-up reel motor is connected between a point between the resistor 62 and contacts $F_4$, and a point between resistor 63 and contacts $R_4$. The armatures of the two motors in combination with their respective field coils comprise conventional D. C. shunt motors.

Referring to the tape direction control circuit, the winding of the forward master relay F is arranged to receive power from the positive and negative leads through the normally closed contacts of a 4-contact reverse push button switch $M_R$, normally closed contacts $S_1$ of micro-switch S, the normally open contacts $T_2$ of micro-switch T, the normally open contacts $F_5$ of the forward master relay F, and the normally open contacts of a 4-contact forward push button switch $M_F$.

The winding of the reverse master relay R is arranged to receive power from the positive and negative leads through the normally open relay contacts $R_5$ of the master reverse relay R, the normally open contacts $S_2$ of switch S, the normally open contacts of reverse push button switch $M_R$, the normally closed contacts $T_1$ of switch T, and the normally closed contacts of the forward push button switch $M_F$. A push button manual stop switch $M_S$ urged in a normally closed position by a spring (not shown) is in the negative lead so that the supply of power to the tape direction control circuit may be interrupted manually.

The two tape sensors 49, 50 are maintained under vacuum by a common connection 50A. The relative dimensions of the tape perforations and the apertures of the sensors are such that the aperture of either sensor is only partially uncovered by the coincidence of its respective tape perforations. The increase in pressure resulting from registry of a perforation with its respective aperture is sufficient to actuate the associated switch but is insufficient to cause the other switch to be actuated. Should either or both of the apertures become completely uncovered, e. g., due to tape breakage, the pressure increase in the vacuum system will be sufficient to actuate both switches, S and T.

All of the contacts in Fig. 2 are shown in a normal stop position, i. e., with both power capstans revolving, the vacuum supply on, the tape covering the apertures in both sensors, and the manual stop switch closed to supply power to all three control circuits.

Assuming that forward tape transport is desired, the forward push button switch, which is normally urged by a spring (not shown) into the position shown in Fig. 2 is momentarily actuated to complete the circuit through the winding of the forward master relay and the winding of the solenoid 36 which then forces the tape against capstan 34, causing the tape to be pulled through the operational zone in a forward direction. Contacts $F_1$, $F_2$, $F_3$, $F_4$ and $F_5$ all change from the positions shown in Fig. 2. The closing of contact $F_5$ locks the relay forward master relay in an energized condition and the forward pinch roller is held against the forward capstan so that tape is continuously pulled through the operational zone in a forward direction. Due to the opening of contacts $F_1$ and $F_4$ and the closing of contacts $F_2$ and $F_3$, the two reel motors are driven in a forward direction. Resistors 54 and 62 are of such values that the supply reel motor runs at a speed to deliver tape at a rate slightly less than that required by the forward capstan, and the take-up reel motor runs at a speed to take up tape at a rate slightly greater than that required by the forward capstan. The slipping clutch associated with each motor compensates for the speed difference which is necessary to accommodate the change in tape winding and unwinding rate on the reels due to the constantly changing diameter of the tape wound on the reels. The clutches may be replaced by other suitable arrangements such as that disclosed in co-pending application Serial No. 430,334, filed May 17, 1954.

Unless interrupted by manual operation, forward tape transport continues until the perforation in the end of the tape associated with the supply reel passes over the aperture in the tape sensor 49 which then actuates switch S to momentarily change the positions of contacts $S_1$ and $S_2$. The momentary opening of contacts $S_1$ allows contacts $F_5$ to open thus unlocking the forward master relay. This allows all F contacts to return to the positions shown in Fig. 2 and the forward pinch roller is disengaged from the forward capstan. The momentary closing of contacts $S_2$ energizes the master reverse relay R and the solenoid 40 which actuates the reverse pinch rollers 39. Energization of relay R causes $R_1$, $R_2$, $R_3$, $R_4$ and $R_5$ to change and remain in the opposite positions from those shown in Fig. 2 due to the locking action of closed contact $R_5$. The two reel motors are now driven in a reverse direction. Resistors 56 and 63 are of such values that the supply reel motor is driven at a speed to wind up the tape slightly faster than supplied by the reverse capstan and the take-up reel motor is driven to deliver tape at a rate slightly slower than that required by the reverse capstan, the difference in speed being compensated by the slipping clutches. The tape is thus transported in a reverse direction until the tape perforation near the end of the tape wound around the take-up reel passes over the aperture of the tape sensor 50 and actuates switch T, causing contacts $T_1$ and $T_2$ to reverse the position shown in Fig. 2. This de-energizes the winding of the reverse master relay and re-energizes the forward master relay winding, causing the tape to be driven in the forward direction. Thus, the tape will run back and forth through the operational zone for an indefinite number of times until the operation of the circuit is interrupted, for example, by the manual stop switch.

If the circuit is in the condition shown in Fig. 2, that is, the normal stop position, and it is desired to start the operation by running the tape through the operational zone in the reverse direction, the reverse push button switch which is normally urged by a spring (not shown) in the position shown in Fig. 2 is momentarily actuated to energize the reverse master relay causing the tape to start moving in a reverse direction. The operation of the circuit is then as described above to run the tape from one end to the other through the operational zone as many times as required.

In the event of tape failure, either one or both of the apertures of the end-of-tape sensors will become completely uncovered permitting a relatively large pressure build-up in the vacuum system serving the sensors, thus actuating both the switches S and T associated with the end-of-tape sensors and causing contacts $S_1$ and $T_1$ to be open. When this occurs, regardless of whether the tape was being passed through the operations zone in a forward or reverse direction, both master relays are de-energized causing the tape to stop being driven through the operational zone and all contacts in the motor control circuits assume the position illustrated in Fig. 2, thus causing armatures of both reel motors to be shorted and producing a powerful electromagnetic braking action on both reel motors. This stops all tape movement and prevents unnecessary unwinding or troublesome back-lash of the tape.

If it is desired to stop instead of reverse tape transport when either end of the tape is reached, contacts $S_2$ and $T_2$ may be either removed or permanently held open so that reversal of tape transport does not occur automatically when either end of the tape is reached.

As mentioned previously, the vacuum chamber of the tape sensor may be divided into several vacuum compartments each of which is provided with an aperture on which the tape is arranged to slide. The tape may then be perforated in a coded manner so as to control a plurality of magnetic reading heads to read selectively a predetermined channel on the tape, or the tape may be perforated along various channels intermediate the end of the tape to cause the tape transport to be controlled either to stop or change directions before the end-of-tape is reached or else cause information to be selectively read from a predetermined channel of the tape.

I claim:

1. Apparatus for generating a signal in response to the movement of a perforated tape, the apparatus comprising a first chamber having a first aperture over which the tape is arranged to slide, the first aperture of the first chamber being formed with respect to the tape perforations so that it is only partially uncovered as the perforated tape slides over it, the first chamber having a second aperture, a movable diaphragm attached to the first chamber and disposed over the second aperture so that the first chamber diaphragm is deflected as the pressure in the first chamber changes when its first aperture is at least partially uncovered, a first electric switch connected to the first chamber diaphragm to be actuated when the first chamber diaphragm is deflected, a second chamber having a first aperture over which the tape is arranged to slide, the first aperture of the second chamber being formed with respect to the tape perforations so that it is only partially uncovered as the perforated tape slides over it, the second chamber having a second aperture, a movable diaphragm attached to the second chamber and disposed over the second aperture, so that the second chamber diaphragm is deflected as the pressure in the second chamber changes when its first aperture is at least partially uncovered, a second electric switch connected to the second chamber diaphragm to be actuated when the second chamber diaphragm is deflected, a conduit connecting the two chambers together, means for establishing a pressure differential across the first apertures of the chambers through the conduit, said means and conduit being so related that when one of the first apertures is partially uncovered by a tape perforation, the associated switch is actuated but the other switch is unaffected, and when either of the first apertures is completely uncovered both switches are actuated.

2. Apparatus for controlling the movement of a perforated tape through an operational zone, the apparatus comprising a first chamber having a first aperture over which the tape is arranged to slide, the first chamber having a second aperture, a first movable diaphragm attached to the first chamber and disposed over the second aperture of the first chamber so that the first diaphragm is deflected as the pressure in the first chamber changes when the first aperture of the first chamber is at least partially uncovered, a first electric switch connected to the first diaphragm to be actuated when the first diaphragm is moved by a change of pressure in the first chamber, a second chamber having a first aperture over which the tape is arranged to slide, the second chamber having a second aperture, a second movable diaphragm attached to the second chamber and disposed over the second aperture of the second chamber so that the second diaphragm is deflected as the pressure in the second chamber changes when the second aperture of the first chamber is at least partially uncovered, a second electric switch connected to the second diaphragm to be actuated when the second diaphragm is moved by a change of pressure in the second chamber, a supply reel on one side of the operational zone, and around which one end of the tape is wound, means for driving the supply reel in either of two directions, a reverse pinch roller and driving capstan between the supply reel and the operational zone for pulling the tape through the operational zone in a reverse direction, a take-up reel on the other side of the operational zone and around which is wound the other end of the tape, means for driving the take-up reel in either of two directions, a forward pinch roller and driving capstan between the take-up reel and the operational zone for pulling the tape through the operational zone in a forward direction, means for maintaining a pressure differential between the interior and exterior of the chambers, the first chamber being disposed between the supply reel and the reverse pinch roller and capstan, and the second chamber being disposed between the take-up reel and the forward pinch roller and driving capstan.

3. In a tape transport system including an operational zone, a supply reel powered by an electric motor for furnishing a perforated tape to the zone, a take-up reel powered by an electric motor for removing the tape from the zone, a supply reel motor control circuit for driving the supply reel motor in either of two directions, a take-up reel motor control circuit for driving the take-up reel motor in either of two directions, the combination which comprises a first chamber having a first aperture over which the tape is arranged to slide, the first chamber having a second aperture, a first movable diaphragm attached to the first chamber and disposed over the second aperture of the first chamber so that the first diaphragm is deflected as the pressure in the first chamber changes when the first aperture in the first chamber is at least partially uncovered, a first electric switch attached to the first diaphragm to be actuated when the diaphragm is moved by a change in pressure in the first chamber, a second chamber having a first aperture over which the tape is arranged to slide, means for maintaining a pressure differential between the interiors and exteriors of the two chambers, the second chamber having a second aperture, a second movable diaphragm attached to the second chamber so that the diaphragm attached to the second chamber is deflected as the pressure in the second chamber changes when the first aperture in the second chamber is at least partially uncovered, and a second electric switch attached to the second diaphragm to be actuated when the second diaphragm is moved by a change in pressure in the second chamber when the first aperture in the second chamber is at least partially uncovered, the first switch being connected to the two control circuits to reverse the directions of the two motors when the tape is being moved in one direction and when the first aperture in the first chamber is at least partially uncovered, and the second switch being connected to the two control circuits to reverse the directions of the two motors when the tape is being moved in the other direction and when the first aperture in the second chamber is at least partially uncovered.

4. In a tape transport system including an operational zone, a supply reel powered by an electric motor for furnishing a perforated tape to the zone, a take-up reel powered by an electric motor for removing the tape from the zone, a supply reel motor control circuit for driving the supply reel motor in either of two directions and for applying electromagnetic braking to the supply reel motor, a take-up reel motor control circuit for driving the take-up reel motor in either of two directions and for applying electromagnetic braking to the take-up reel motor, the combination which comprises a first chamber having a first aperture over which the tape is arranged to slide, the first chamber having a second aperture, a first movable diaphragm attached to the first chamber and disposed over the second aperture of the first chamber so that the first diaphragm is deflected as the pressure in the first chamber changes when the first aperture in the first chamber is partially uncovered, a first electric switch attached to the first diaphragm to be actuated when the first diaphragm is moved by a change in pressure in the first chamber, a second chamber having a first aperture over which the tape is arranged to slide, a common conduit connecting the interiors of the two chambers, means for maintaining a pressure differential between the interiors and exteriors of the two chambers, the second chamber having a second aperture, a second movable diaphragm attached to the second chamber so that the second diaphragm is deflected as the pressure in the second chamber changes when the first aperture in the second chamber is at least partially uncovered, and a second electric switch attached to the second diaphragm to be actuated when the second diaphragm is moved by a change in pressure in the second chamber when the first aperture in the second chamber is at least partially uncovered, the first apertures in the first and second chambers being arranged with respect to the tape perforation so that the first apertures are only partially uncovered as the perforated part of the tape passes over the first apertures, the first switch being connected to the two control circuits to reverse the directions of the two motors when the tape is being moved in one direction and when the first aperture in the first chamber is partially uncovered, and the second switch being connected to the two control circuits to reverse the directions of the two motors when the tape is being moved in the other direction and when the first aperture in the second chamber is partially uncovered, the common conduit connecting the chambers being of such size that when either of the first apertures is completely uncovered the pressure changes sufficiently in both chambers to actuate both switches whereby electromagnetic braking is applied to both motors.

References Cited in the file of this patent

UNITED STATES PATENTS

| | | |
|---|---|---|
| 2,180,793 | Carlson | Nov. 21, 1939 |
| 2,377,323 | Carlson | June 5, 1945 |
| 2,683,568 | Lindsay | July 13, 1954 |
| 2,710,154 | Baumrucker et al. | June 7, 1955 |